US008649505B2

(12) United States Patent
Michaelis et al.

(10) Patent No.: US 8,649,505 B2
(45) Date of Patent: Feb. 11, 2014

(54) MONITORING KEY-PRESS DELAY AND DURATION TO DETERMINE NEED FOR ASSISTANCE

(75) Inventors: Paul Michaelis, Louisville, CO (US); David Mohler, Arvada, CO (US); Michael J. Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/525,038

(22) Filed: Jun. 15, 2012

(65) Prior Publication Data

US 2012/0253701 A1 Oct. 4, 2012

Related U.S. Application Data

(62) Division of application No. 11/805,050, filed on May 22, 2007, now Pat. No. 8,233,613.

(51) Int. Cl.
*H04M 1/00* (2006.01)

(52) U.S. Cl.
USPC ...................................... 379/422; 379/433.07

(58) Field of Classification Search
USPC ..................... 379/433.01–440; 200/1 R–1 V; 455/418–425
See application file for complete search history.

(56) References Cited

U.S. PATENT DOCUMENTS

| 5,323,246 A | 6/1994 | Kotani et al. |
| 5,392,338 A | 2/1995 | Danish |
| 5,394,168 A * | 2/1995 | Smith et al. .................... 345/156 |
| 5,418,527 A * | 5/1995 | Yashiro ......................... 340/4.37 |
| 5,493,608 A | 2/1996 | O'Sullivan |
| 5,652,630 A | 7/1997 | Bertram et al. |
| 5,691,580 A * | 11/1997 | Shelby ............................ 307/119 |
| 5,747,756 A * | 5/1998 | Boedecker ..................... 200/5 A |
| 5,872,837 A | 2/1999 | Johnson |
| 6,094,136 A * | 7/2000 | Wyman .......................... 340/541 |
| 6,259,955 B1 * | 7/2001 | Brundisini et al. ............. 700/15 |
| 6,346,894 B1 * | 2/2002 | Connolly et al. ............... 341/22 |
| 6,411,687 B1 | 6/2002 | Bohacek et al. |
| 6,735,307 B1 * | 5/2004 | Volckers .................. 379/433.07 |
| 6,760,583 B2 * | 7/2004 | Ito et al. ......................... 455/425 |
| 6,965,664 B1 | 11/2005 | McIntosh et al. |
| 7,032,169 B2 | 4/2006 | Ativanichayaphong et al. |
| 7,218,250 B2 | 5/2007 | Laliberte |
| 7,233,831 B2 * | 6/2007 | Blackwell ....................... 700/17 |
| 7,446,669 B2 | 11/2008 | Liebermann |
| 7,737,373 B2 * | 6/2010 | In et al. .......................... 200/1 B |
| 7,940,913 B2 * | 5/2011 | Patel et al. ................. 379/265.02 |
| 8,233,613 B1 | 7/2012 | Michaelis et al. |
| 2006/0077038 A1 | 4/2006 | Hopkins et al. |
| 2006/0256950 A1 | 11/2006 | Patel et al. |

* cited by examiner

*Primary Examiner* — Duc Nguyen
*Assistant Examiner* — Assad Mohammed
(74) *Attorney, Agent, or Firm* — Sheridan Ross P.C.

(57) ABSTRACT

In a user-interactive system, such as an interactive voice response (IVR) system, the duration and/or force of key-presses by the user and/or the speed of response to prompts by the user are used to make inferences about the user, such as whether the user is impaired or is growing frustrated. The user interface is modified based on the inferences.

11 Claims, 2 Drawing Sheets

MONITORING KEY-PRESS DELAY AND DURATION TO DETERMINE NEED FOR ASSISTANCE

CROSS-REFERENCE TO RELATED APPLICATIONS

This application is a divisional of U.S. patent application Ser. No. 11/805,050, filed May 22, 2007, the entire disclosure of which is hereby incorporated herein by reference.

TECHNICAL FIELD

This invention relates generally to interactive systems, and specifically to interactive communications systems.

BACKGROUND OF THE INVENTION

Callers who experience difficulty with an interactive voice response (IVR) system may become so frustrated that they hang up before accomplishing their objective. This can result in toward, and lost revenue for, the called party. Thus, there is a need to detect when callers are having trouble, and intervene on their behalf. The like considerations exist not only in IVR systems, but in any systems that require interaction with a user, such as Automatic Call Distribution (ACD) systems, for example.

In this context, users with cognitive and/or physical disabilities might have a harder time navigating a typical IVR or other interactive user interface than the general population. Therefore, disability access rules enforced by the FCC require support for people who are cognitively impaired. Specifically, the Code of Federal Regulations, 36 C.F.R. Part 1193.41(i), states the following: "Input, control, and mechanical functions shall be operable with limited cognitive skills. Provide at least one mode that minimizes the cognitive, memory, language, and learning skills required of the user." This regulation implies that IVR systems should adjust their behavior to accommodate the needs of cognitively impaired users. Unfortunately, it is often not practical—and perhaps even illegal—to maintain a database that identifies specific caller IDs or specific accounts as belonging to someone who has a disability. The problem then is, how can an IVR system detect automatically that a user is impaired? A way of detecting need for assistance is to monitor a user's interaction with the system. Indeed, some IVR systems monitor key-press sequences in order to detect that a user is having problems. For example, it may be assumed that users need additional help when they frequently ask for menus to be repeated, or if they are observed to go down a branch of a menu, come back up, go down a different branch, and then come back up again. Key-press duration has been used to determine the action to be taken. For example, on an electric typewriter, it is common for the "key repeat" function to be triggered by holding down a key longer than is necessary for a single character to be typed. And on electronic watches, it is common for a programming mode change to be triggered by holding down a button. Such time-dependent controls are explicit components of the user interface. In the mid 1980s, studies were conducted by Telcordia Technologies (then named Bell Communications Research, Inc.) to determine whether measurements of inter-digit pauses while personal identification numbers (PINs) are being entered might help to detect when the PINs are being entered by someone other than their owners.

SUMMARY OF THE INVENTION

According to one aspect of the invention, the duration of actuations of an actuator (e.g., key-presses) by a user are used to make inferences about the user, such as whether or not the user is having difficulty with the user interface and needs assistance. According to this aspect, the duration of actuation of an actuator is determined; in response to a long duration, the user interface is modified; and in response to a not-long duration, the interface is not so modified. According to another aspect of the invention, the speed of response to prompts (i.e., the delay between prompts to a user and the user's actuations of an actuator in response to those prompts) is used to make inferences about the user. According to this aspect, the speed of response to a prompt is determined; in response to a slow speed, the user interface is modified; and in response to a not-slow speed, the interface is not so modified. According to yet another aspect of the invention, the force, pressure, of actuation of an actuator is also used to make inferences about the user, such as whether the user is growing frustrated. According to this aspect, the force of actuation of an actuator is determined; in response to a high force, the user interface is modified; and in response to a not high force, the interface is not so modified. Preferably, a system uses the duration of the actuation, the force of the actuation, and/or delay data, in combination with other metrics (for example, the number of times that a user asks for a menu to be repeated) in order to improve the accuracy of the inference.

The user interface is adjusted based on the inferences. For example, if it is detected that a user's key-press durations change during a single IVR session from a normal level to an extended level, it is inferred that the user is having trouble or is growing frustrated, and the system can respond by transferring the call to a human agent. Or, if it is detected that the key-press durations are extremely long at the start of the session, and remain long during the session, it is inferred that the user has a disability of some sort. This could be a physical disability, such as a motor-skill impairment, or a cognitive disability. It is possible to distinguish between the two by examining other metrics; for example, frequent requests for menus to be repeated is assumed to indicate cognitive or language issues, rather than a physical disability. Or, the user can be questioned in order to determine the nature of the user's disability. On the one hand, when a cognitive or language problem is assumed to be present, the IVR system can adjust the user interface by, for example, slowing down the playback rate of the speech, adjusting the menu structure so that fewer options are presented at each node (thereby making the available options easier to remember), explaining each option in greater detail, and/or requesting confirmation of the user's entries from the user. On the other hand, an accommodation for people with motor impairments is an automatic lengthening of the call-terminating time-out period, or of the system-imposed inter-digit time-out period, when users are entering a series of characters (e.g., dialing a phone number).

Conversely, if it is detected that a user's key-presses have unusually short durations, it may be inferred that the user is an experienced user who is familiar with the interface, and the system can respond by making the interface navigable by the user more quickly, such as by giving the user terse prompts and more choices at each prompt, and playing the prompts at a faster speed.

Although these examples describe telephony applications, the idea is useful in other domains, such as with interfaces to portable electronic devices and to computers, and with Internet applications. For example, the technique is as useful when applied to button-press durations on a mouse or stylus-press durations on a computer as it is for dial-pad key-press durations.

While the invention has been characterized above as a method, it also includes apparatus that performs the method, as well as a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
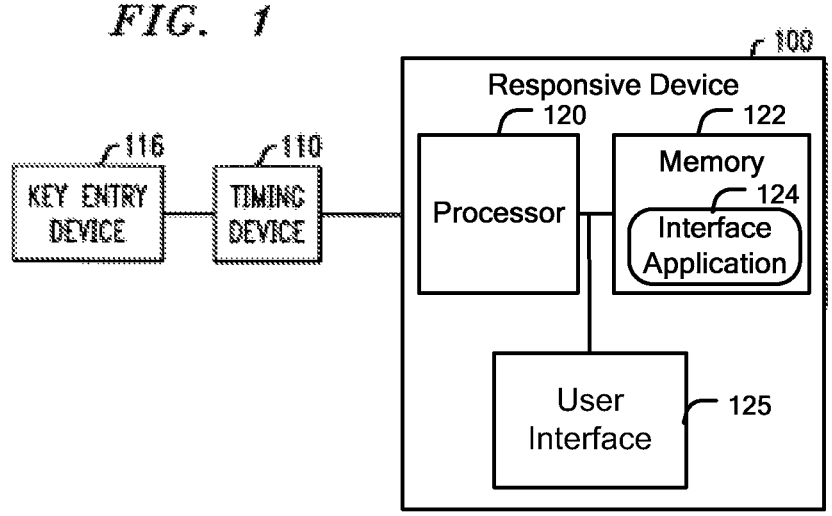
FIG. 1 is a block diagram of a system that includes an illustrative embodiment of the invention.

FIG. 1 is a block diagram of a system that includes an illustrative embodiment of the invention. The system includes a key entry device 116 by means of which a user enters information by pressing keys, a timing device 110 for timing key-press durations and/or delays, and a responsive device 100 that responds to the key-press durations and/or delays. Device 100 is typically computerized and comprises a processor 120 and a memory 122 or any other computer-readable medium storing data and/or programs for use by processor 120, including an interface application program 122 that implements a user interface for a user of key entry device 116.

System 100 is described generically, and may take many different forms in actual implementation. For example, the system of FIG. 1 may be a telecommunication system where key entry device 116 is the dial keypad of a telephone, timing device 110 is a timing function of a telephone switch, and responsive device 100 is an IVR system. Or, the system of FIG. 1 may be a computer or a personal digital assistant (PDA) where key entry device 116 is a keyboard, mouse, stylus, and/or a touch-sensitive screen, timing device 110 is a timing function of the computer or PDA, and responsive device 100 comprises a display of the computer or PDA. Or, the system of FIG. 1 may be a game controller where key entry device 116 is a joystick and button game control, timing device 110 is a timing function of the game controller, and responsive device 100 is the speaker and display or display output of the game controller. These are just a few illustrative examples of the myriad forms that the system of FIG. 1 can take.

Figure 2:
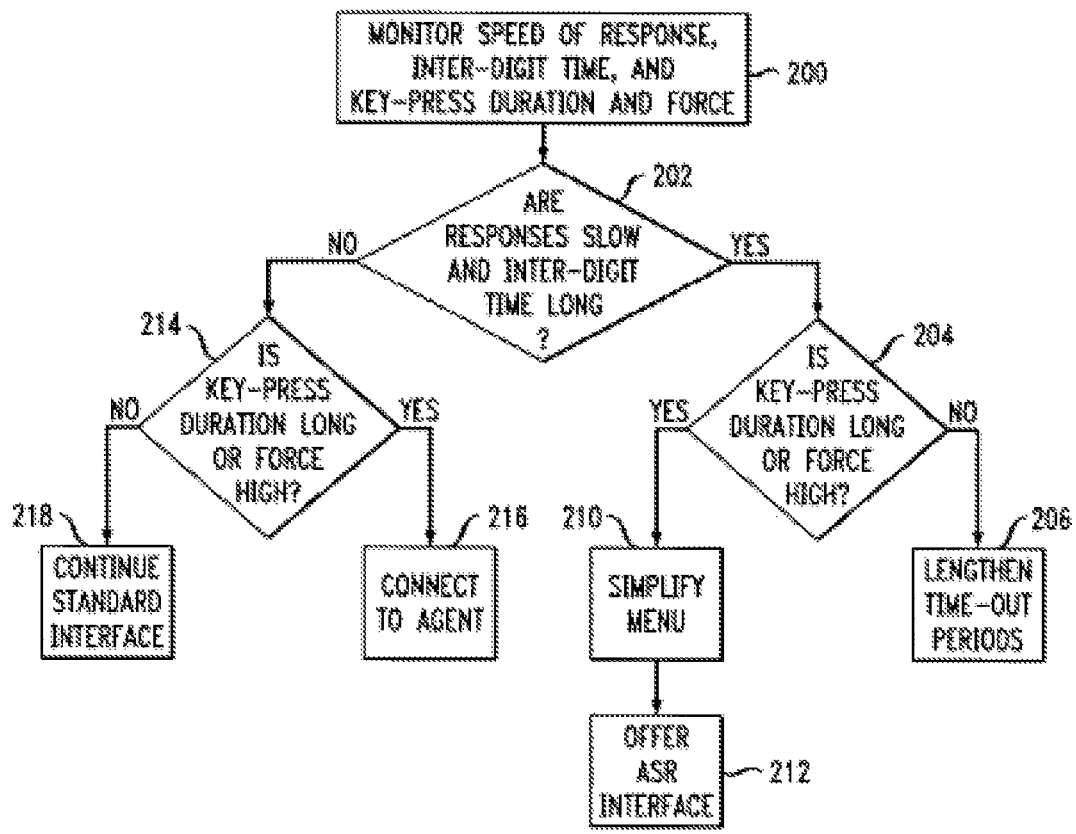
FIG. 2 is a functional flow diagram of a first illustrative embodiment of an interface application of the system of FIG. 1.

FIG. 2 shows functionality of one illustrative embodiment the system of FIG. 1 where key entry device 116 is a wireless phone and responsive device 100 is an IVR system executing interface application 124. The wireless phone detects the speed of its user's response to IVR prompts, the inter-digit intervals between key-presses, and the key-press durations and force, at step 200, and reports them to the IVR system, for example, via the tone-duration field of system messages of the IETF RPC 2833 signaling protocol. The IVR system compares the response speed and inter-digit intervals against historical records for either this user or the population at large to determine if the response speed is slow and inter-digit time is long, at step 202. If so, the IVR system compares the key-press durations and force against historical records to determine if the durations are long or the force is high, at step 204. If so, the system infers that the user is distracted, perhaps because he or she is using the telephone while driving, and therefore it lengthens the inter-digit time-out and call-terminating time-out periods, at step 206. Returning to step 204, if the IVR system determines that the key-press durations are long or forceful, it infers that the user is impaired, and therefore it simplifies the menus that it presents to the user, at step 210, and offers assistance of an automatic speech recognition (ASR) interface to the user, at step 212.

Returning to step 202, if the IVR system determines that the response time and the inter-digit time are not slow, it compares the key-press durations and force against historical records to determine if the durations are long or the force is high, at step 214. If so, the system infers that the user is frustrated, and therefore connects the user to a human agent, at step 216. If the IVR system determines at step 214 that the key-presses are not long or forceful, it infers that the user needs no assistance with the user interface, and therefore it continues to present the standard, unmodified, interface to the user, at step 218.

Figure 3:
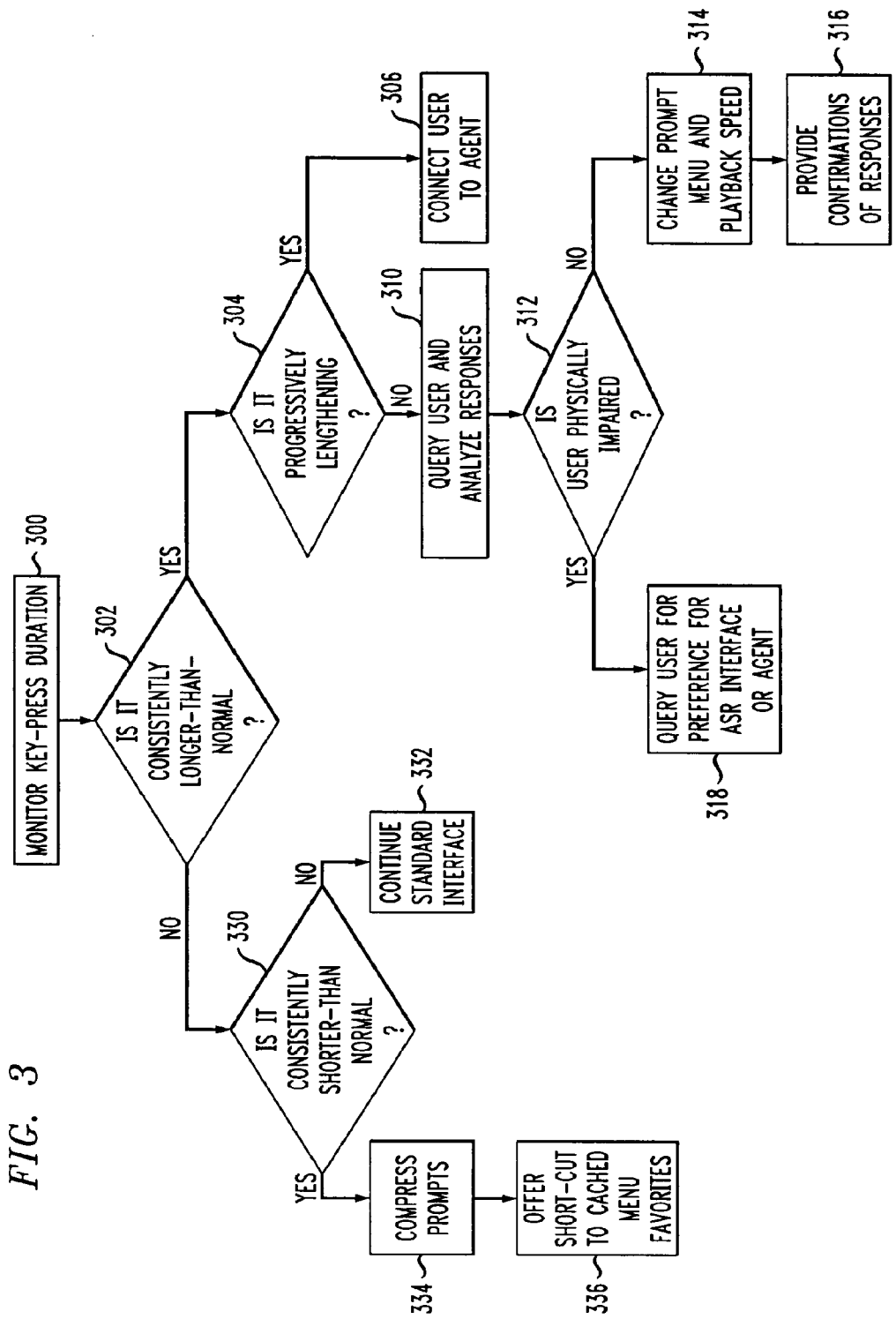
FIG. 3 is a functional flow diagram of a second illustrative embodiment of the interface application of the system of FIG. 1.

FIG. 3 shows functionality of a second illustrative embodiment the system of FIG. 1 where key entry device 116 is a fixed phone and responsive device 100 is an IVR system executing interface application 124. The switching system to which the phone is connected acts as timing device 110 and monitors the user's key-press durations, at step 300, which it then reports to the IVR system. The IVR system stores the duration information. If the IVR system detects that the key-press duration is consistently longer-than-normal, at step 302, it compares the newly-arriving duration information against the stored information to determine if the durations of key-presses are progressively getting longer, at step 304. If so, the IVR system infers that the user is getting frustrated, and so it connects the user to an agent, at step 306; if not, IVR system queries the user to determine what the problem may be, at step 310. For example, it may query whether it would help the user to slow down the playing speed of the menu prompts. It might also query the user whether fewer options per menu would be helpful. Other variations in the user interface could be offered and implemented based on feedback from the user. It then uses the user's responses to determine if the user is physically or cognitively impaired, at step 312. If the user is believed to be cognitively impaired, the IVR system changes the prompt-menu structure to present simpler choices to the user, and also slows down the playback speed of the prompts, at step 314. The actual difference between a distracted user and one with cognitive impairment may not matter in terms of the options offered to the user, since both can require the same action. The IVR system also starts to provide confirmations of the user's responses to the user, at step 316. If the user is found, at step 312, to have a physical impairment, the IVR system queries the user for whether he or she would prefer to use an ASR interface, or to speak to an agent, at step 318.

Returning to step 302, if the key-press durations are not consistently found to be longer-than-normal, the IVR system checks whether the key-press durations are consistently shorter-than-normal, at step 330. If so, the IVR system infers that it is interacting with an experienced user, or one that has normal abilities and is in a hurry, and so it compresses the prompts that it gives to the user, at step 334, for example, by making the prompts terser, presenting more choices in each announcement, and increasing the playback speed of each announcement. If the IVR system keeps historical records on past interactions with users, the IVR system may also offer to skip the menu and short-cut the user to a cached menu of the user's favorite choices, at step 336. If the IVR system finds at step 330 that the key-press durations are not consistently shorter-than-normal, it just continues to present the standard interface to the user, at step 332.

Of course, various changes and modifications to the illustrative embodiment described above will be apparent to those skilled in the art. For example, other environments in which the invention may be advantageously employed include interacting with an ACD system, a game where the controller adjusts the sensitivity of the joy stick and/or the user feedback based on the input observed at a previous level in the game so that the game learns to be tougher as the user's skills at the game gets better, interacting with a burglar alarm keypad where the user gets better over timer at the use of the system so as to benefit from speed-up but where the user on occasion may be slower than typical because he or she is carrying something, and interacting with a TV remote control where detection that the operator is having problems may result in the TV screen being used to display to the operator the steps involved in using the remote to reach a particular program and/or activation of an easier interface that requires the operator to use just the arrow keys and an "enter" button. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
    determining, over time, forces of a plurality of separate actuations of one or more actuators by a user, wherein the one or more actuators are keys in a key entry device, wherein a first force of the plurality of separate actuations is a historic average of separate forces for actuating the one or more actuators;
    comparing the determined forces of the separate actuations to determine if the forces are increasing over time;
    in response to determining that the forces of the separate actuations are increasing over the time, modifying a user interface; and
    in response to determining that the forces of the separate actuations are not increasing over the time, forbearing from said modifying the user interface.

2. The method of claim 1, wherein determining further comprises:
    determining both the force and a duration of the actuating of the one or more actuators, wherein modifying comprises:
    in response to at least one of the separate actuations increasing over time and a long said duration, modifying the user interface, and wherein forbearing comprises:
    in response to at least one of the separate actuations not increasing over time and a not-long said duration, forbearing from said modifying.

3. An apparatus comprising:
    a user interface operable to interface with a user;
    a device in communication with the user interface, the device comprising a processor and a memory, the device operable to:
        determine, over time, forces of a plurality of separate actuations of one or more actuators by a user, wherein the one or more actuators are keys in a key entry device, wherein a first force of the plurality of separate actuations is a historic average of separate forces for actuating the one or more actuators;
        compare the determined forces of the separate actuations to determine if the forces are increasing over time;
        modify the user interface in response to the forces of the separate actuations increasing over time, and
        forbear from said modifying the user interface in response to the forces of the separate actuations not increasing over time.

4. The apparatus of claim 3, wherein the device comprises an interactive voice response system, and wherein the one or more actuators are included in a keyboard of a user terminal device.

5. The apparatus of claim 3, wherein the device comprises a wireless phone, and wherein the one or more actuators are included in a dialpad of the phone.

6. The apparatus of claim 3, wherein the device comprises a computer, and wherein the one or more actuators are included in a keyboard or a mouse of the computer.

7. The apparatus of claim 3, wherein the device comprises a personal digital assistant, and wherein the one or more actuators are included in a keyboard or a touch-sensitive screen of the personal digital assistant.

8. The apparatus of claim 3, wherein the device comprises a burglar alarm system, and wherein the one or more actuators are included in a keypad of the burglar alarm system.

9. The apparatus of claim 3, wherein the device comprises an electronic game, and wherein the one or more actuators are a hand control of the game.

10. The apparatus of claim 3, wherein the device comprises a television; and wherein the one or more actuators are included in a remote control of the television.

11. The apparatus of claim 3, wherein the device further comprises:
    a timing device for determining durations of pressing of the at least one key; and
    a responsive device for selectively modifying the user interface in response to the determined durations.

* * * * *